(No Model.)

E. ENDERES.
VEHICLE BRAKE.

No. 448,913. Patented Mar. 24, 1891.

WITNESSES:

INVENTOR

BY

ATTORNEYS.

UNITED STATES PATENT OFFICE.

ERNST ENDERES, OF LITTLE PORT, IOWA.

VEHICLE-BRAKE.

SPECIFICATION forming part of Letters Patent No. 448,913, dated March 24, 1891.

Application filed December 12, 1890. Serial No. 374,514. (No model.)

*To all whom it may concern:*

Be it known that I, ERNST ENDERES, a citizen of the United States, residing at Little Port, in the county of Clayton and State of Iowa, have invented new and useful Improvements in Vehicle-Brakes, of which the following is a specification.

My invention relates to improvements in vehicle-brakes in which the force of the brake-bar is resisted by a direct connection with the axle, whereby to relieve the body of the vehicle from the pulling strain in applying the brake; and my said improvements consist in the arrangement and combination of parts, which are particularly pointed out and designated in the claim concluding this specification.

Figure 1:
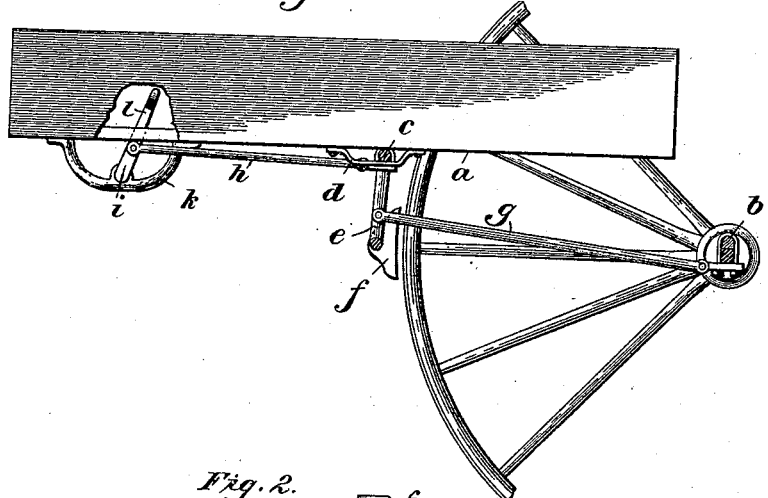
Figure 2:
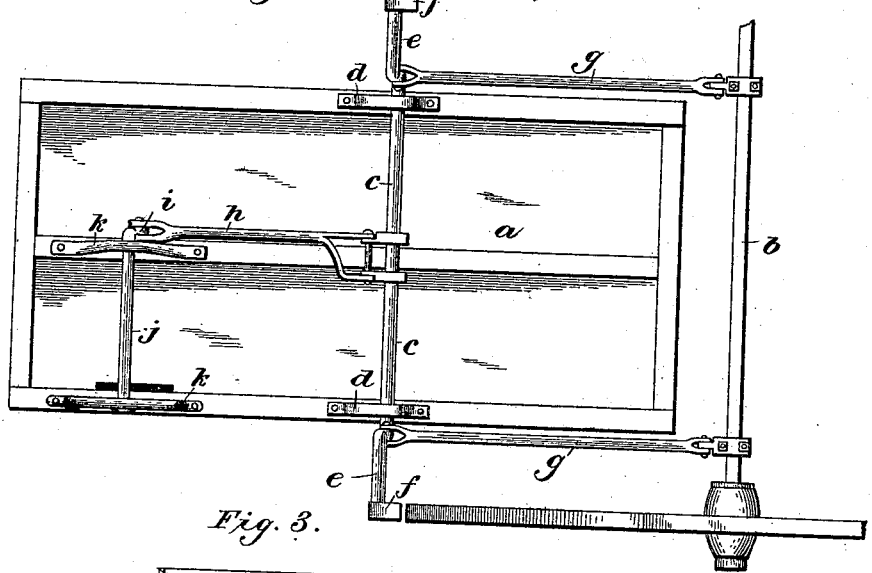
Figure 3:
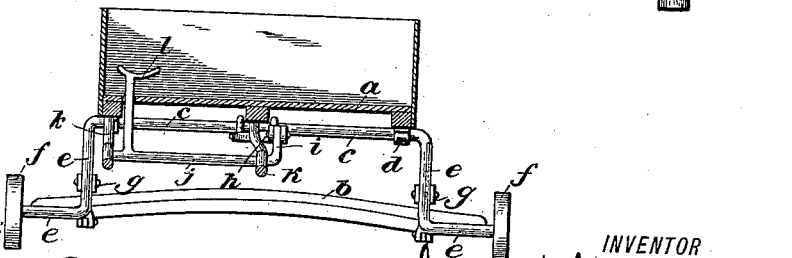

Referring to the drawings, Figure 1 is a vertical longitudinal section of so much of a vehicle as shows my improved brake applied to the rear axle. Fig. 2 is a bottom view, and Fig. 3 is a vertical cross-section of the same.

In the drawings, $a$ indicates the bottom of the vehicle-body, and $b$ the rear axle thereof. The brake-bar $c$ is of double-crank form, and is connected to the under side of the vehicle-body in transverse relation thereto by means of loop-brackets $d$ $d$, firmly secured to the under side of the body at each side thereof, so that the brake-bar will have a free sliding movement within said bracket-loops in applying and releasing the brake. The crank-arms $e$ $e$ of the brake-bar stand down with their brake-shoes $f f$ in position to act upon the wheels, and these crank-arms are fulcrumed upon the axle by links $g$ $g$, suitably pivoted to the vertical portions of said crank-arms and to the axle, so that in applying the brakes the pulling force will be upon these links. Now with the cranked brake-bar suspended from and supported only by the bracket-loops and fulcrumed upon the axle the brake can be operated by the driver by pulling the brake-bar forward at its top within its supporting-loops to bring the brake-shoes upon the wheels and the resisting force upon the axle, thus giving the advantage of supporting the brake-bar upon the vehicle-body and permitting the driver to apply the brakes without bringing the force upon the body.

The means provided for applying the brake consists of a rod $h$, pivotally clipped to the upper suspended part of the brake-bar, and extending forward, preferably beneath the body, is pivotally connected to the cranked end $i$ of a bar $j$, mounted in brackets $k$ on the under side of the body, and having a crank-arm $l$ standing up in convenient position for the driver's foot or hand, and, so far as I know and can find, the provision for suspending the cranked brake-bar upon the body with freedom to have a sliding movement upon said body and fulcrumed upon the axle is new and gives a durable and effective brake operated by the driver to transfer the strain from the vehicle-body to the axle.

Looking at the drawings it will be seen that the braces $g$ $g$ are not attached to the horizontal part $c$ of the brake-rod, but to the vertical arms $c'$ $c'$ thereof near the shoe-carrying cranks, thus leaving the brake-rod free to slide in its loop-brackets to apply the brakes to bring the strain upon the axle. This advantage could not be obtained if the braces were connected with the horizontal part of the brake-rod. It will also be seen that the loop-brackets have no function as stops to limit the sliding movement of the brake-rod therein, for such function would prevent the operation of the brake as I have devised it.

I know now that it is not new to mount the cranked brake-rod in slotted hangers, so as to allow the rod to slide within certain limits and to form stops to such movements, the strain in applying the brake being upon the body of the vehicle and upon said brackets. I know now, also, that it is not new to connect the brake-rod to the axle by braces and to provide for the sliding movement of the rod on the body of the vehicle by T-shaped sliding boxes mounted on rods secured to the body, the braces in such case not being connected to the crank-arms of the rod, but requiring compound crank-connections with the brake-rod to operate the brakes and to bring the strain upon the braces. Hence my improvement is specifically confined to the construction shown, in which the sliding brake-rod is not stopped by its loop-brackets and the braces are secured to the crank-arms $c'$ $c'$ of the brake-rod.

I claim as my improvement—

In a vehicle-brake, the combination of the loop-brackets $d$ $d$, secured to the body, the sliding cranked brake-rod, the braces $g$ $g$, connecting the vertical arms $c'$ $c'$ of the sliding brake-rod with the axle, and suitable connections for operating the brake-rod, as shown and described.

In testimony whereof I have hereunto set my hand in the presence of two subscribing witnesses.

ERNST ENDERES.

Witnesses:
  D. D. MURPHY,
  DENNIS J. MURPHY.